United States Patent [19]

Sullivan

[11] Patent Number: 5,273,481
[45] Date of Patent: Dec. 28, 1993

[54] NET RUCKER

[75] Inventor: Michael J. Sullivan, Rochester Hills, Mich.

[73] Assignee: Brechteen Co., Chesterfield, Mich.

[21] Appl. No.: 932,639

[22] Filed: Aug. 20, 1992

[51] Int. Cl.[5] ............................................. A22C 11/12
[52] U.S. Cl. ....................................... 452/24; 452/33; 138/118.1
[58] Field of Search .................. 452/24, 21, 22, 23, 452/25, 32, 33, 34; 138/118.1

[56] References Cited

U.S. PATENT DOCUMENTS

| Re. 30,390 | 9/1980 | Kupcikevicius et al. | 452/37 |
|---|---|---|---|
| 1,761,189 | 6/1930 | Brennan et al. | 452/24 |
| 2,001,461 | 5/1935 | Hewitt | 452/21 |
| 3,553,769 | 1/1971 | Myles et al. | 432/38 |
| 3,621,513 | 11/1971 | Kupcikevicius | 452/35 |
| 3,726,059 | 4/1973 | Cherio et al. | 138/118.1 |
| 4,044,425 | 8/1977 | Nausedas | 452/35 |
| 4,133,164 | 1/1979 | Mintz | 53/261 |
| 4,150,521 | 4/1979 | Reilly | 53/258 |
| 4,467,499 | 8/1984 | Beckman et al. | 452/24 |
| 4,470,171 | 9/1984 | Rusmussen et al. | 138/112.1 |
| 4,910,034 | 3/1990 | Winkler | 426/420 |
| 4,924,552 | 5/1990 | Sullivan | 452/24 |
| 4,958,477 | 9/1990 | Winkler | 53/138 R |
| 5,156,567 | 10/1992 | Gammon et al. | 452/48 |

OTHER PUBLICATIONS

Net Rucker information for C & K Manufacturing and Sales Company, 4 pgs.

Primary Examiner—Willis Little
Attorney, Agent, or Firm—Harness, Dickey & Pierce

[57] ABSTRACT

Apparatus and method for shirring food stuffing netting onto a net tube utilizing a net rucker head having a plurality of flexible paddles. A net rucker guides the food stuffing netting onto the net tube and reciprocates the net tube up and down through a passage in net rucker head such that the flexible paddles engage the netting to shirr it about the circumference of the net tube.

21 Claims, 2 Drawing Sheets

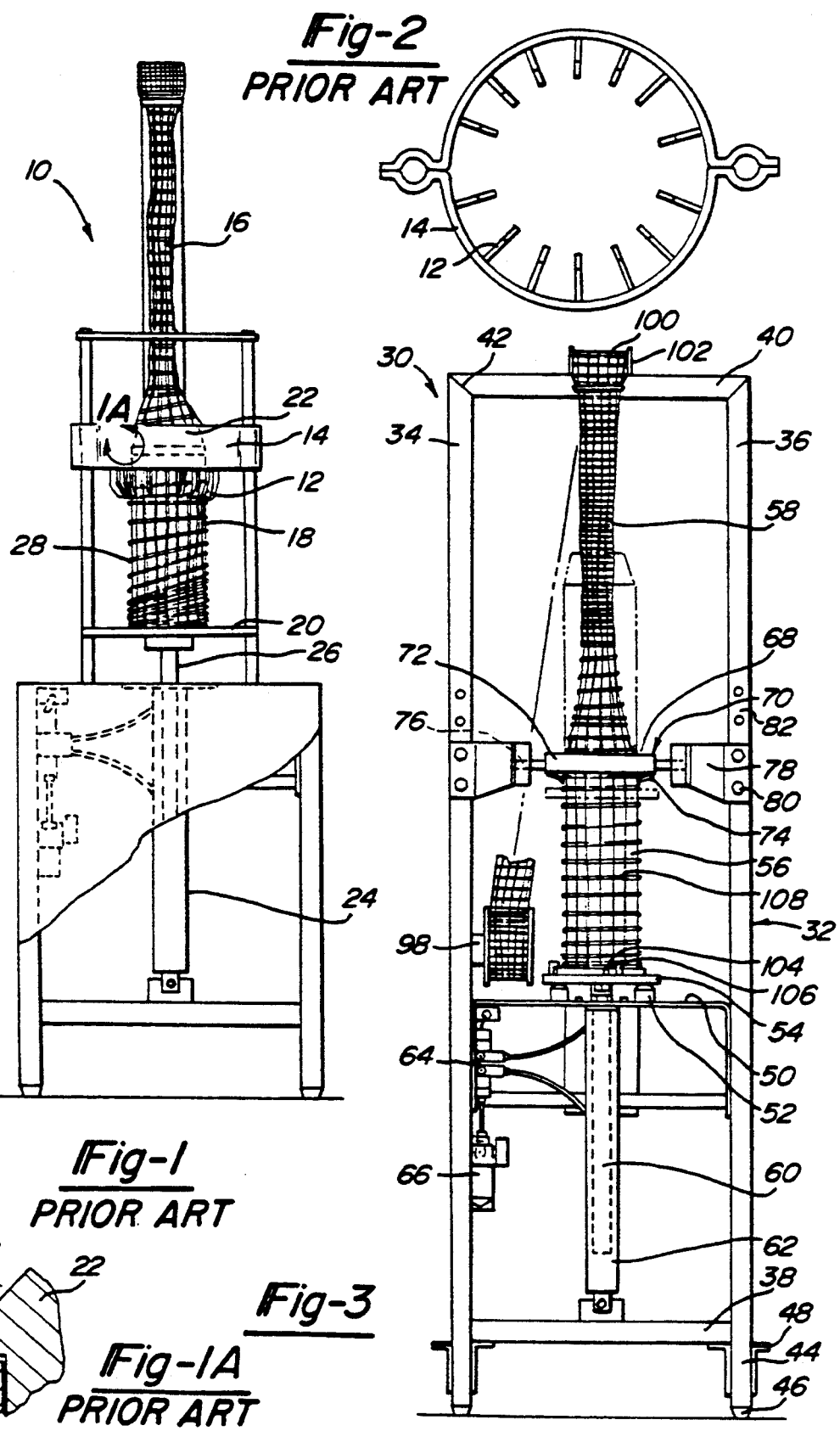

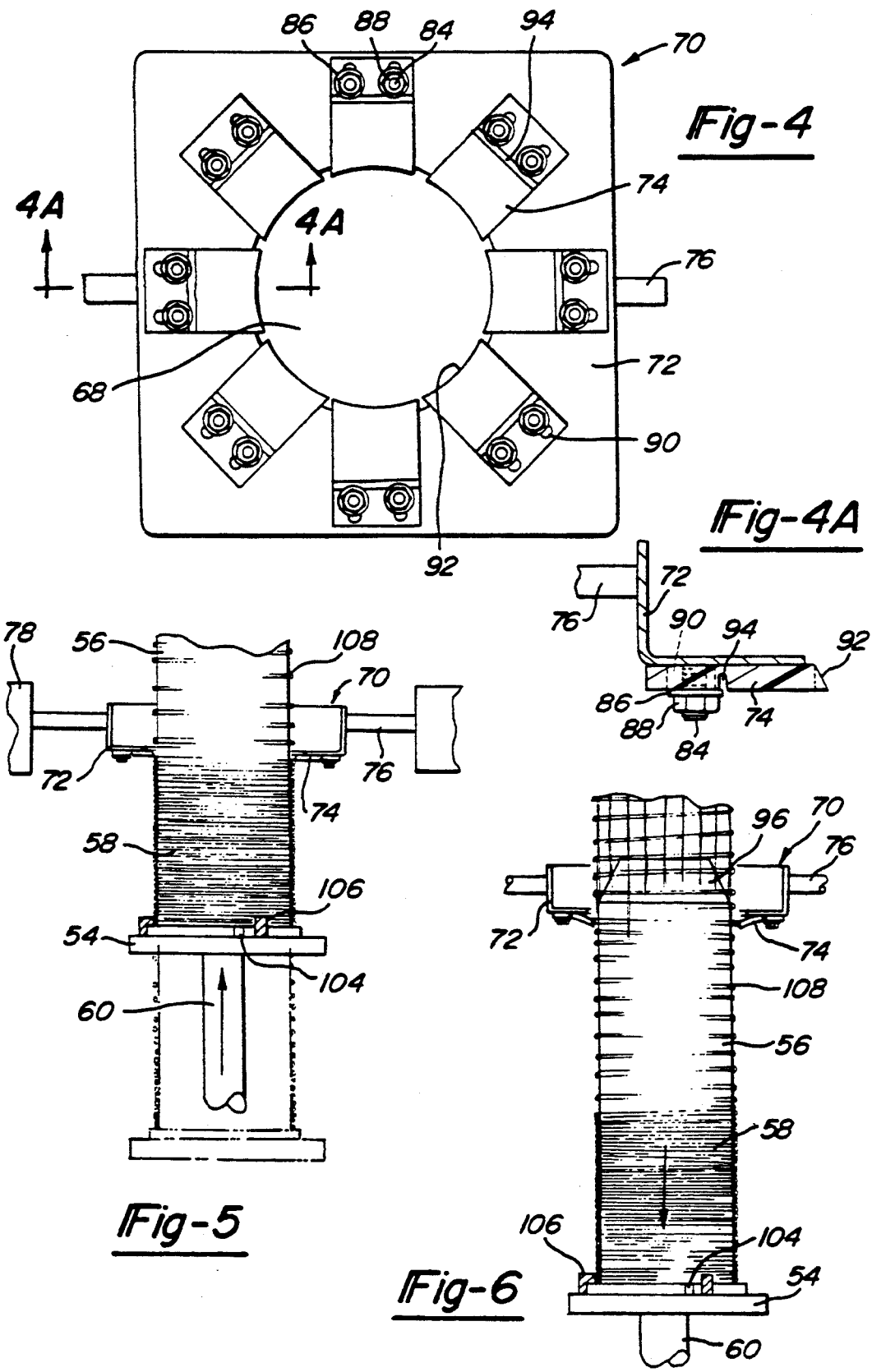

NET RUCKER

BACKGROUND OF THE INVENTION

1. Technical Field

This invention relates generally to food processing equipment and, more particularly, to an improved net rucker for shirring netting onto a temporary carrier in the form of a net tube.

2. Discussion Of The Related Art

Tubular food stuffing netting is often used to hold together and package various types of meat products such as hams, loaves and the like. Typically, the netting is placed over an end of a stuffing horn and the meat products are forced into the netting through a chute in the stuffing horn. The netting is then removed from the horn and clipped around the stuffed meat product. Afterwards, the netted meat product is typically smoked or further processed as desired.

The food stuffing netting is available from a variety of manufacturers such as, without limitation, C&K Manufacturing and Sales Company of Bay Village, OH under the trademark ZIP-NET. The netting often comes in flattened rolls which require that the netting be unrolled and separated prior to use. Certain automated meat stuffing machines are designed for use with a tube that has a quantity of netting gathered or shirred onto it. This tube acts as a temporary carrier for the shirred netting. In operation, the meat stuffing machine forces the meat products into a closed end of the netting in a manner which feeds a portion of the netting from the tube. The meat product is surrounded by the netting which is then gathered and cut. A sufficient quantity of netting is shirred onto the tube so that several stuffing operations can be performed before having to replace the tube containing the shirred netting.

The present invention is primarily concerned with an improved apparatus and method in which the netting is shirre onto the tube. Currently, the aforementioned C&K Manufacturing and Sales Company sells what is known in the trade as a "net rucker" for shirring netting onto a net tube, shown generally in FIG. 1. The net rucker 10 employs a plurality of rigid spring loaded fingers 12 secured to a finger support bracket 14, shown more clearly in FIG. 2. In operation, the rigid spring loaded fingers 12 carry the netting 16 downwardly over a net tube 18 as the net tube 18 is reciprocated up and down on a movable platform 20. The net tube 18 includes a tube cap 22 fitted into the upper end of the net tube 18 to prevent the netting 16 from catching on the otherwise sharp ends of the net tube 18. An air cylinder 24 including a piston 26 connected to the movable platform 20 causes the net tube 18 to reciprocate up and down. During the downward stroke of the net tube 18, the rigid spring loaded fingers 12 slide over the crossbars 28 of the netting 16 until the movable platform 20 is extended to its lowermost position, as substantially shown in FIG. 1. During the upward stroke of the net tube 18, the rigid spring loaded fingers 12 engage the crossbars 28 of the netting 16 thereby causing the netting 16 to be pushed downward or shirred onto the net tube 18 as the movable platform 20 moves the net tube 18 upward.

In this manner, the net rucker 10 performs the operation of shirring the netting 16 onto the net tube 18. Unfortunately, the net rucker 10 has several drawbacks associated with its operation. One drawback of the net rucker 10 occurs while the net tube 18 is being reciprocated up and down. During this movement, the rigid spring loaded fingers 12 sometimes cut and/or rip the netting 16 as the rigid spring loaded fingers 12 pass over or engage the netting 16. This condition typically occurs because the spring loaded fingers 12 are rigid and have sharp pointed ends, as seen most clearly in FIGS. 1A and 2.

A second drawback of the net rucker 10 occurs while the net tube 18 is traveling upward, some of the rigid spring loaded fingers 12 may not fully engage the netting 16. This subsequently causes a portion of the netting 16 to slide past the non-engaged fingers 12, causing a non-uniform packing density of the shirred netting 16 on the net tube 18. This also results in less netting 16 being shirred onto the net tube 18, thus causing the net tube 18 to be replaced more often during the meat stuffing process. This further can cause the netting 16 to become entangled on the net tube 18 during the meat stuffing process.

A third drawback of the known net rucker 10 is that the rigid spring loaded fingers 12 can catch on the lip or seam between the net tube 18 and tube cap 22, as shown most clearly in FIG. 1A. As a result, damage to the net rucker or the netting can occur.

Another net rucker is disclosed in a commonly assigned U.S. Pat. No. 4,924,552 entitled "Net Rucker" issued May 15, 1990 to Michael J. Sullivan. Although these net ruckers meet their objective of shirring the netting 16 onto the net tube 18 there is still room for improvement of these devices. This invention is thus directed towards an improved net rucker which is capable of shirring food stuffing netting with a uniform packing density onto a net tube in an efficient and smooth running manner without degrading the condition of the netting.

SUMMARY OF THE INVENTION

In accordance with the teachings of the present invention, an improved net rucker employing a net rucker head having a plurality of flexible paddles is utilized to shirr food stuffing netting onto a net tube. This is basically achieved by guiding the food stuffing netting onto the net tube and reciprocating the net tube up and down through a passage defined by the net rucker head such that the flexible paddles engage the netting to shirr it about the circumference of the net tube.

In one preferred embodiment, the plurality of flexible paddles each have a tapered concave end partially extending into the passage through which the net tube and netting pass. The tapered concave flexible paddles generally conform to the shape of the net tube to subsequently engage the netting about the circumference of the net tube. During the downward travel of the net tube, the flexible paddles allow the netting and net tube to pass without damaging the netting. During the upward travel of the net tube, the flexible paddles engage the netting as the net tube moves upward, causing the netting to be shirred about the circumference of the net tube in a uniform packing density.

Use of the present invention results in uniformly shirring food stuffing netting onto a net tube in an efficient and smooth running manner without degrading the condition of the netting.

BRIEF DESCRIPTION OF THE DRAWINGS

Still other advantages of the present invention will become apparent to those skilled in the art after reading the following specification and by reference to the drawings in which:

FIG. 1 is a front view of a prior art net rucker machine, the net tube being shown in its initial upward travel during the shirring operation;

FIG. 1A is an enlarged cross-sectional view of a portion of the prior art net rucker machine of FIG. 1 taken about line 1A, in which a rigid spring loaded finger is shown engaging a seam between the net tube and the tube cap;

FIG. 2 is a top view of the prior art rigid spring loaded fingers and a finger support bracket of FIG. 1;

FIG. 3 is a front view of a net rucker machine made in accordance with the teachings of the present invention, the net tube being shown in the lowermost position during an initial stage in the shirring operation;

FIG. 4 is a top plan of the underside of the net rucker head employed in the net rucker machine of FIG. 3;

FIG. 4A is a cross-sectional side view of a portion of the net rucker head of FIG. 4 taken along the line 4A;

FIG. 5 is a partial cross-sectional front view of the net rucker machine of FIG. 3, shown during the upward travel of the net tube; and FIG. 6 is a partial cross-sectional front view of the net rucker machine of FIG. 3, shown during the downward travel of the net tube.

DETAILED DESCRIPTION OF THE PREFERRED EMBODIMENT

The following description of the preferred embodiment concerning net rucker machines is merely exemplary in nature and is in no way intended to limit the invention or its application or uses.

Referring to FIG. 3, one preferred embodiment of an improved net rucker machine 30, is shown. The net rucker machine 30 includes a tubular frame 32, preferably constructed of metal, having a gantry 34 consisting of a pair of side posts 36. The side posts 36 are secured together by a lower base member 38 and a top cross member 40, preferably by welded seams 42. The tubular frame 32 is supported by a pair of tubular legs 44 having neoprene pads 46 and a pair of neoprene castors (not shown). The neoprene castors are connected to the tubular frame 32 by castor brackets 48. The pair of neoprene castors along with the tubular legs 44 having the neoprene pads 46 allows the net rucker machine 30 to be substantially stable during operation while also allowing the net rucker machine 30 to be easily movable.

A work surface 50 including neoprene bumpers 52, provides a seat for a movable platform 54. The movable platform 54 is provided for receiving a lower end of a net tube 56 carrying netting 58. The movable platform 54 is connected to a piston rod 60 in a pressurized cylinder 62. The pressurized cylinder 62 reciprocates piston rod 60 and the movable platform 54 up and down, preferably by pneumatic pressure, controlled by a control valve assembly 64 and a regulator 66. However, it would be apparent to one skilled in the art that hydraulic pressure or other suitable means can be employed to reciprocate movable platform 54 up and down.

As the movable platform 54 is reciprocated up and down by pressurized cylinder 62, the movable platform 54 carries the net tube 56 up and down through a passage 68 in a net rucker head 70. The net rucker head 70, shown clearly in FIG. 4, includes a support frame 72, preferably constructed of stainless steel, a plurality of flexible paddles 74 and a pair of head mounting posts 76.

The head mounting posts 76 mount within head support brackets 78, secured to side posts 36 by support bracket bolts 80. The head support brackets 78 are adjustable to accommodate for various length net tubes 56 by removing the support bracket bolts 80 and securing the head support brackets 78 to a ne desired position, designated by reference numeral 82.

Turning to FIG. 4A, the flexible paddles 74 are rigidly secured adjacent to the outer periphery area of the passage 68 in the support frame 72 by mounting studs 84, washers 86 and locking nuts 88. The mounting studs 84 pass through adjustable slots 90 in the flexible paddles 74 which allows the flexible paddles 74 to be captured between the lower surface of the support frame 72 and the locking nuts 88. The adjustable slots 90 allow the flexible paddles 74, which have tapered concave ends 92, to be adjusted to form a substantially circular and flexible passageway extending into the inner periphery area of passage 68, conforming to the circumference of the net tube 56. The adjustable slots 90 can further accommodate for any wear that may occur at the tapered concave ends 92 because of contact with the net tube 56 and netting 58.

The flexible paddles 74 are preferably constructed of flexible polyurethane, however, it would be apparent to one skilled in the art that other flexible material may be utilized. In addition, a notch 94 extending substantially parallel to the width of the flexible paddles 74, allows the flexible paddles 74 to flex along the notch 94. This in turn allows the flexible paddles 74 to be easily flexed perpendicular to the passing net tube 56 and netting 58.

In operation, an operator places an empty net tube 56 on the work surface 50 in front of the movable platform 54 when positioned in its lowermost position, as shown in FIG. 3. A tube cap 96 having tapered sidewalls is inserted into the upper end of the net tube 56. The tapered sidewalls of the tube cap 96 cover the otherwise sharp ends of the net tube 56 to prevent the netting 58 from catching on the sharp ends of the net tube 56. The operator threads or guides the roll of netting 58 from a feeder 98 over guide rollers 100 secured to the top crossmember 40 by guide roller brackets 102. The netting 58 is then threaded down through net rucker head 70, separated and pulled downwardly over tube cap 96 and onto net tube 56. Then, the net tube 56 is placed onto the movable platform 54. The lower flange of the net tube 56 is provided with one or more notches 104 which fit over one or more lugs 106 on the movable platform 54. The net tube 56 is then twisted by the operator thereby carrying the flange underneath a lip of the lugs 106 to lock the net tube 56 onto the movable platform 54.

After the net tube 56 is locked onto the movable platform 54, the operator starts the net rucker machine 30, which causes the net tube 56 to be reciprocated up and down, as shown in FIGS. 5 and 6. The upward travel of the movable platform 54 is generated by a preselected amount of air which is controlled by the control valve assembly 64 and the regulator 66. This preselected amount of air is then applied to the pressurized cylinder 62 which provides a controlled amount of back pressure to the movable platform 54, as will be discussed shortly.

During the upward travel of the net tube 56, shown clearly in FIG. 5, the flexible paddles 74 do not bend but extend transversely to engage netting crossbars 108 as the net tube 56 passes through passage 68 in the net rucker head 70. This causes the netting 58 to be forced downward onto the net tube 56 in uniform stacks of folded layers thereby shirring the netting 58 about the circumference of the net tube 56. The shirred layers of netting 58 provides an increased diameter around the net tube 56 which subsequently provides a downward or stopping force on the movable platform 54. The pressure applied to the pressurized cylinder 62 is sufficiently weak to permit the movable platform 54 to be substantially stopped by the increased diameter of the shirred netting 58 about net tube 56 during the upward travel. This pressure can then be controlled in a manner to determine the density of the shirred netting 58 about the net tube 56.

During the downward travel of the net tube 56, shown clearly in FIG. 6, the flexible paddles 74 bend downwardly to allow the net tube 56 and netting 58 to pass as the movable platform 54 moves downward. This causes the netting 58 to be pulled from the feeder 98 and over guide rollers 100. Subsequently, as the net tube 56 reciprocates up and down, the net tube 56 becomes completely surrounded by shirred layers of netting 58. At that time, the netting 58 is cut above the tube cap 96 and pushed downwardly over the upper ends of the net tube 56. The tube cap 96 is removed and the net tube 56 twisted to align the notches 104 with the lugs 106 to permit the filled net tube 56 to be lifted from the platform 54. The filled net tube 56 is then transported and attached to a meat stuffing machine (not shown), where subsequent meat stuffing operations take place as is understood in the art.

The foregoing discussion discloses and describes merely exemplary embodiments of the present invention. One skilled in the art will readily recognize from such a discussion, and from the accompanying drawings and claims, that various changes, modifications and variations can be made therein without departing from the spirit and scope of the invention as defined by the following claims.

What is claimed is:

1. A net rucker head for shirring netting onto a tube having an axis, said net rucker head comprising:
    a support frame, said support frame defining a passage extending through the support frame;
    a plurality of flexible paddles, each of said paddles having a first end and a second end;
    securing means for rigidly securing the first end of each flexible paddle to the support means adjacent to the passage so that the second end of each flexible paddle partially extends into the passage to define an opening for receiving the tube and the netting therein; and
    said second end of each flexible paddle extending substantially perpendicular to the axis of the tube for engaging the netting and shirring the netting about the tube during upward travel of the tube relative to the flexible paddles, with the flexible paddle being sufficiently flexible to bend downwardly to permit the tube and the netting to pass during downward travel of the tube relative to the flexible paddles.

2. The net rucker head of claim 1 wherein the support frame defines a circular passage extending through the support frame.

3. The net rucker head of claim 2 wherein the second end of each flexible paddle has a concave shape substantially parallel to a portion of the circular passage.

4. The net rucker head of claim 3 wherein the concave shape of the second end of each flexible paddle defines a substantially flexible circular opening substantially parallel to the circular passage having a diameter less than the circular passage.

5. The net rucker head of claim 4 wherein the second end of each of the plurality of flexible paddles is tapered, sloping downwardly away from the support frame.

6. The net rucker head of claim wherein each flexible paddle defines a notch extending substantially parallel to the width of the flexible paddles, said notch operable to allow each flexible paddle to flex along the notch.

7. The net rucker head of claim 1 wherein each flexible paddle is made of polyurethane.

8. The net rucker head of claim 1 wherein the support frame is made of stainless steel.

9. The net rucker head of claim 1 wherein the securing means includes a plurality of mounting studs affixed to the support frame and a plurality of locking nuts, said plurality of locking nuts operable to secure the plurality of flexible paddles to the support frame by engaging the plurality of mounting studs.

10. The net rucker head of claim 1 wherein each flexible paddle is made of a flat resilient material.

11. A net rucker apparatus for shirring food stuffing netting onto a net tube having an axis, said net rucker apparatus comprising:
    a movable platform, said movable platform operable to support the net tube;
    a net rucker head, said net rucker head including a support frame and a plurality of flexible paddles, said support frame defining a passage through which the net tube and the netting pass, said plurality of flexible paddles rigidly secured to the support frame;
    guide means for guiding the netting onto the net tube; and
    reciprocating means for raising and lowering the movable platform supporting the net tube, said reciprocating means operable to cause the flexible paddles of the net rucker head to extend substantially perpendicular to the axis of the net tube for engaging the netting and shirring the netting about the net tube during upward travel of the net tube relative to the flexible paddles, with the flexible paddles being sufficiently flexible to bend downwardly to permit the net tube and the netting to pass during downward travel of the net tube relative to the flexible paddles.

12. The net rucker apparatus of claim 11 wherein the plurality of flexible paddles each have a tapered concave end generally conforming to the shape of the net tube.

13. The net rucker apparatus of claim 11 wherein each flexible paddle defines a notch extending substantially parallel to the width of the flexible paddles, said notch operable to allow each flexible paddle to flex along the notch.

14. The net rucker apparatus of claim 11 which further comprises:
    feeder means for supporting a roll of flat netting, said feeder mean operable to feed the flat netting to the guide means.

15. The net rucker apparatus of claim 11 which further comprises:
    a tube cap removably plugged into an end of the net tube opposite the movable platform, said tube cap having a tapered surface blending into side walls of the net tube for preventing the netting from catching on the end of the net tube.

16. The net rucker apparatus of claim 12 wherein each flexible paddle is mounted to a lower surface of the support frame to prevent the paddles from being bent upwardly during upward motion of the net tube, while permitting the paddles to bend downwardly during downward movement of the net tube.

17. The net rucker apparatus of claim 11 wherein the reciprocating means includes a pressurized cylinder having a piston rod connected to the movable platform, said pressurized cylinder operable to cause the movable platform to move upward and downward in a reciprocating motion.

18. The net rucker apparatus of claim 17 wherein the pressurized cylinder provides a predetermined amount of lift to the moveable platform which is sufficiently weak to permit the movable platform to be substantially stopped during upward travel when the netting has been shirred on the circumference of the net tube.

19. The net rucker head of claim 11 wherein each flexible paddle is made of a flat resilient material.

20. A method of shirring a food stuffing netting onto a net tube, said method comprising the steps of:
   providing a net tube;
   guiding one end of the netting over the net tube;
   placing the net tube onto a movable platform; and
   reciprocating the movable platform upward and downward to carry the net tube and the netting through a passage defined by a net rucker head having a plurality of flexible paddles such that the plurality of flexible paddles allow the net tube and netting to pass as the movable platform moves downward and allows the net tube to pass but engages the netting as the platform moves upward to cause the netting to be shifted about the circumference of the net tube, wherein the flexible paddles are not bent but extend transversely to the net tube during upward travel thereof to thereby engage the netting, with the flexible paddles bending downwardly to permit the netting to slide by the flexible paddles during downward movement of the net tube.

21. The method as defined in claim 20 further comprising the step of:
   providing a tube cap; and
   inserting the tube cap into an end of the net tube opposite the movable platform; and
   providing a predetermined amount of lift to the moveable platform which is sufficiently weak to permit the movable platform to be substantially stopped during upward travel when the netting has been shirred on the circumference of the net tube.

* * * * *